(12) United States Patent
Hu et al.

(10) Patent No.: US 6,745,995 B2
(45) Date of Patent: Jun. 8, 2004

(54) ELECTROMAGNETICALLY CONTROLLED BUTTERFLY THERMOSTAT VALVE

(75) Inventors: Fuzheng Hu, Toronto (CA); David Mark Pascoe, Newmarket (CA)

(73) Assignee: Tesma International Inc., Concord (CA)

( * ) Notice: Subject to any disclaimer, the term of this patent is extended or adjusted under 35 U.S.C. 154(b) by 169 days.

(21) Appl. No.: 10/133,615

(22) Filed: Apr. 26, 2002

(65) Prior Publication Data

US 2002/0179165 A1 Dec. 5, 2002

Related U.S. Application Data

(60) Provisional application No. 60/286,492, filed on Apr. 26, 2001, and provisional application No. 60/309,527, filed on Aug. 1, 2001.

(51) Int. Cl.$^7$ .................... F16K 11/052; F16K 31/44
(52) U.S. Cl. .................... 251/81; 123/41.08
(58) Field of Search ............... 123/41.08, 41.09, 123/41.1; 251/79, 81; 137/875

(56) References Cited

U.S. PATENT DOCUMENTS

| | | | |
|---|---|---|---|
| RE19,445 E | * 2/1935 | Chandler | 251/81 |
| 2,988,108 A | 6/1961 | Malmquist et al. | |
| 3,664,706 A | * 5/1972 | Chant | 251/81 |
| 4,178,963 A | 12/1979 | Riefler et al. | |
| 4,501,297 A | 2/1985 | Baker | |
| 4,860,992 A | * 8/1989 | Aunspach | 251/81 |
| 5,950,576 A | 9/1999 | Busato et al. | |
| 5,979,373 A | * 11/1999 | Sano | 123/41.1 |
| 6,016,774 A | 1/2000 | Bokkers et al. | |
| 6,178,928 B1 | 1/2001 | Corriveau | |
| 6,178,929 B1 | 1/2001 | Schatz | |
| 6,196,167 B1 | 3/2001 | Marsh et al. | |

\* cited by examiner

*Primary Examiner*—John Fox
(74) *Attorney, Agent, or Firm*—Clark Hill PLC

(57) ABSTRACT

An improved cooling system for an internal combustion engine is disclosed. The system utilizes an electronically controlled butterfly valve to control coolant flow between the engine and a radiator, thereby maintaining the engine temperature at a substantially optimum temperature. The valve includes a valve housing having an inlet port in fluid communication with an outlet port. A valve core is seated in the housing for selectively opening and closing the outlet port. A driving mechanism is operatively coupled to the valve core for positioning the valve core between open and closed positions relative to the outlet port. A damping mechanism is coupled between the driving mechanism and the valve core for preventing the driving mechanism from locking in the open or closed position during loading of the valve core with the housing and inlet or outlet ports.

18 Claims, 16 Drawing Sheets

ELECTROMAGNETICALLY CONTROLLED BUTTERFLY THERMOSTAT VALVE

RELATED APPLICATIONS

This application claims all the benefit and priority under 35 USC 119(e) to U.S. Provisional Patent Application No. 60/268,492 filed on Apr. 26, 2001 and 60/309,527 filed on Aug. 1, 2001.

BACKGROUND OF THE INVENTION

1. Technical Field

The subject invention relates generally to cooling systems for internal combustion engines of automotive vehicles and, more particularly, to an electromagnetically controlled thermostat valve for controlling the flow of liquid coolant to a radiator.

2. Description of the Related Art

An internal combustion engine that powers an automobile normally has a liquid cooling system for removing waste heat generated by the combustion process in the engine. Such a cooling system may comprise a pump operated by the engine, a radiator, and a thermostat valve. As the pump circulates liquid coolant through the system, engine heat is transferred to the coolant passing through engine coolant passages. When the engine has reached a predetermined operating temperature, the thermostat valve opens to allow coolant to flow through the radiator where heat is transferred from the coolant to ambient air passing across exterior surfaces of the radiator. Hence, the thermostat valve restricts coolant flow to the radiator until the engine heats the coolant to a temperature corresponding to the operating temperature of the engine. This allows a cold engine to reach the desired operating temperature more quickly. Once the thermostat valve has fully opened, the temperature of the coolant, and hence that of the engine, can fluctuate over a range of operating temperatures determined by various factors such as the size of the radiator, the rate at which the pump pumps liquid coolant through the radiator, how the engine is being operated, and the ambient air temperature. Should the operating temperature fall below this range, the thermostat valve will once again restrict flow to the radiator in an effort to restore the operating temperature of the engine.

Most thermostat valves have bimetallic coil or wax pellet type actuators. These valves are self-contained devices that open and close according to predetermined temperature limits. They have certain disadvantageous operating characteristics, including relatively slow response times and relatively wide switching hysteresis. Such characteristics result in a wide range of temperatures over which the valve operates between closed and open positions. Hence, such thermostats exhibit relatively loose temperature regulation. Furthermore, conventional thermostats do not allow optimal control over the cooling system because they passively respond to changes in coolant temperature only. Other factors, such as actual engine temperature, engine speed, coolant flow rate, and ambient air temperature cannot be utilized when setting the operating state of such thermostats.

Active thermal management control systems increase the fuel economy of automobiles, and use an electrically-controlled flow divider, or so-called proportional thermostat valve. Existing electromagnetic thermostat valves use linear actuators to replace wax pellets found in conventional thermostats. Although this design allows control by a central computer, the valve movement is against the fluid flow direction, just like in a conventional thermostat. Therefore, the linear actuator requires a constant power supply. Furthermore, the valve only has very a limited number of configurations, which are insufficient to achieve optimal and efficient operating conditions.

An example of a proportional coolant valve that is driven by a rotary actuator is disclosed by Busato et al in U.S. Pat. No. 5,950,576. The rotary actuator of this valve has to overcome a friction torque created by a coil spring against a moving element, and hence, also requires a constant power supply.

Another disadvantage arises with both types of valve systems when debris and impurities such as iron oxide, sand or scale is present in the coolant. The debris can cause clogging or potential seizure of two surfaces that move relative to one another.

SUMMARY OF THE INVENTION

The apparatus of the present invention addresses the need for a more rapid and effective control of coolant temperature than conventional systems. To obtain high cooling efficiencies, the thermostat valve according to one aspect of the invention is controlled via a central computer by monitoring other variables in addition to coolant temperature, such as engine block temperature, engine speed, coolant flow rate, and ambient air temperature. This control is achieved with a relatively simple mechanical device that affords complete control over the amount of coolant flow that reaches the radiator. Additional benefits include minimal power consumption to operate the valve, and the ability to independently control fluid flow to the radiator or bypass valves.

The apparatus of the present invention also addresses the need for a valve that is unaffected by the level of impurities in the coolant.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
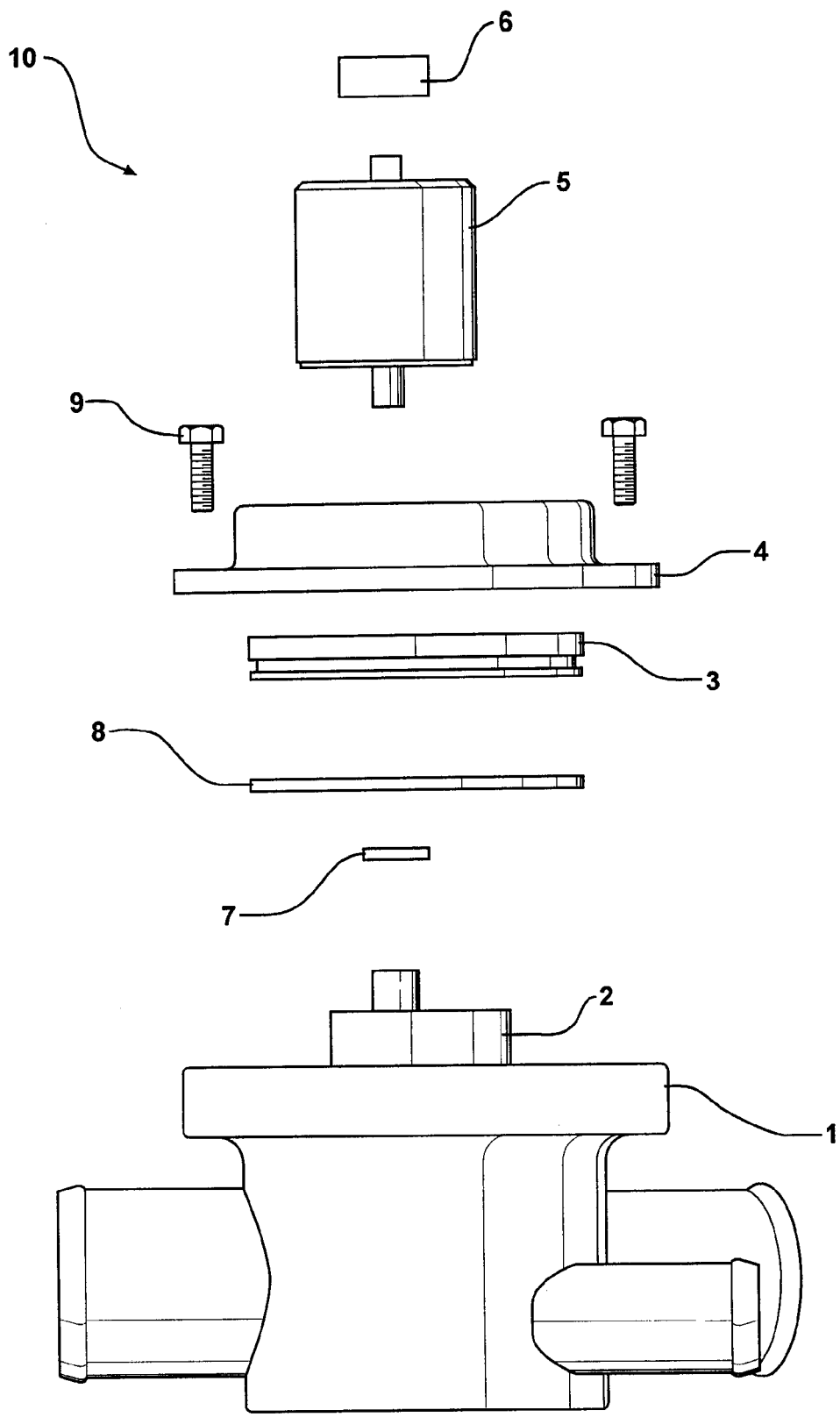
FIG. 1 is an exploded orthogonal view of the thermostat valve and actuator according to the present invention.

Referring to FIGS. 1 through 4, wherein like numerals indicate like or corresponding parts throughout the several views, FIG. 1 shows an electromagnetically controlled thermostat valve assembly 10 comprising a valve housing 1, a valve core 2, a sealing plate 3, a cover 4, an electric driving mechanism or actuator 5, a valve position sensor 6, seals 7 and 8, and bolts 9. Bushings or bearings may be necessary to support the valve rotary shaft, although such bushings or bearings are not illustrated. The valve position sensor 6 may not be necessary, depending on the actuation system used.

Figure 2:
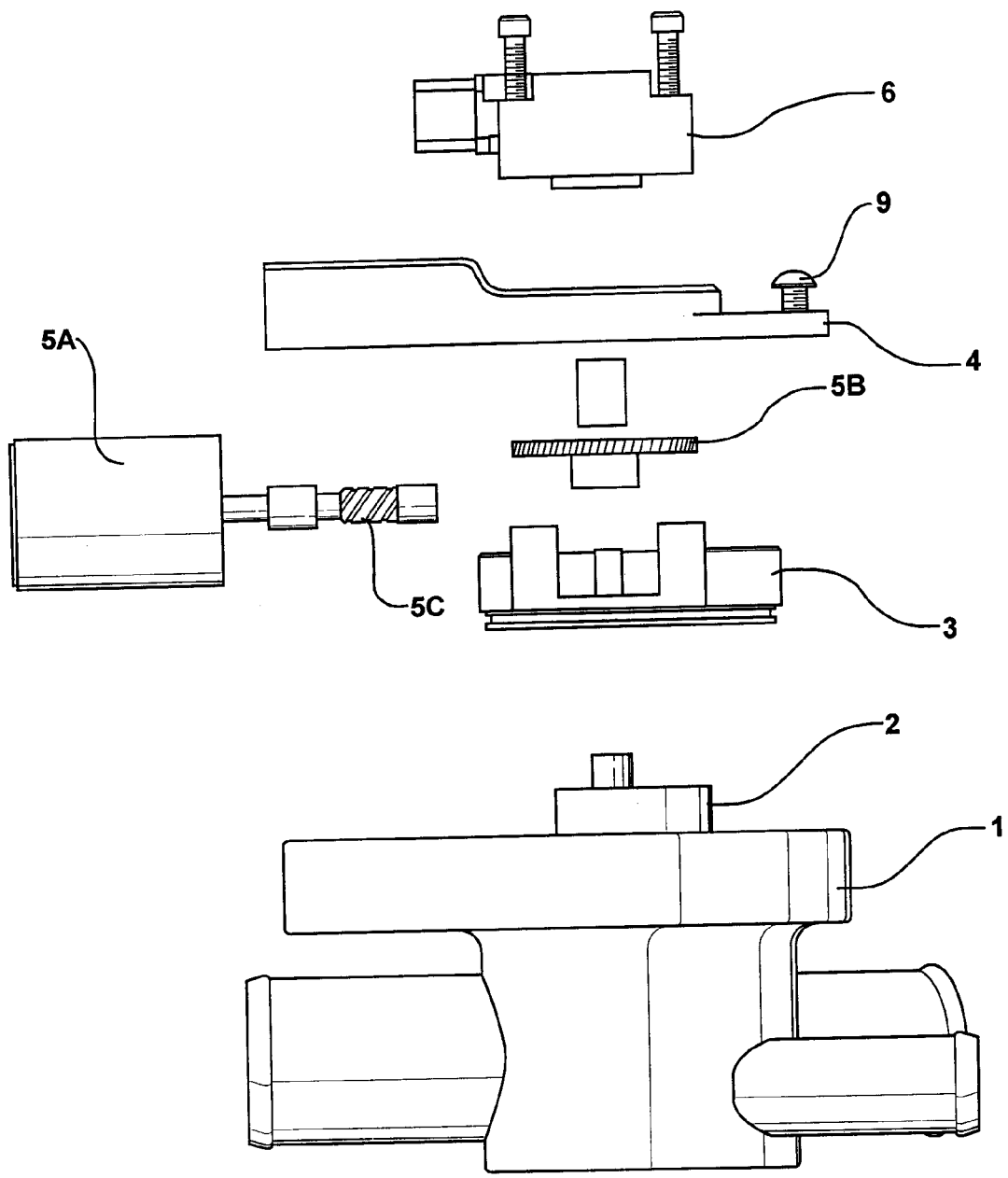
FIG. 2 is an exploded orthogonal view similar to that shown in FIG. 1, wherein the actuator includes a DC motor with a worm gear set.
Figure 3:
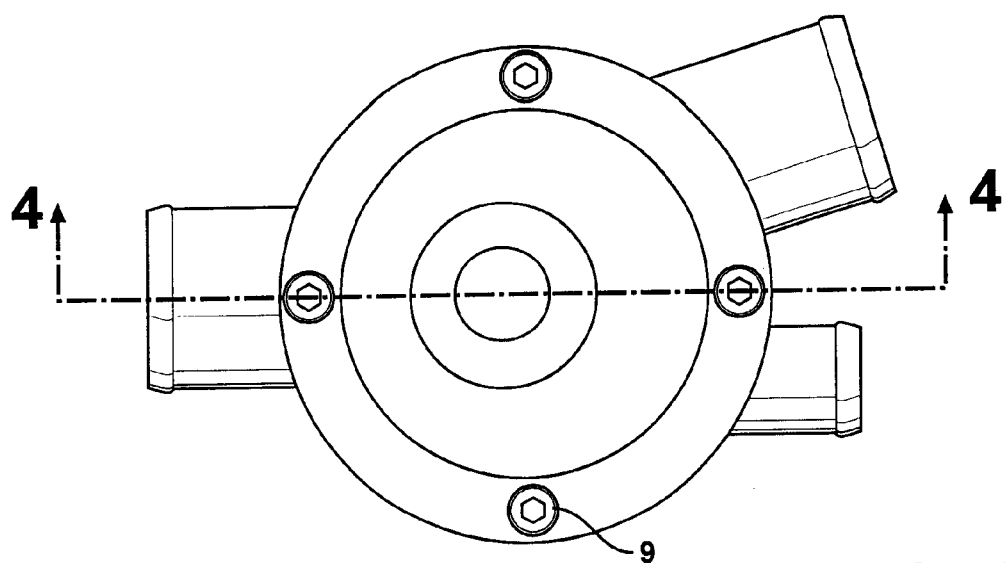
FIG. 3 is a top view of the valve and actuation components.
Figure 4:
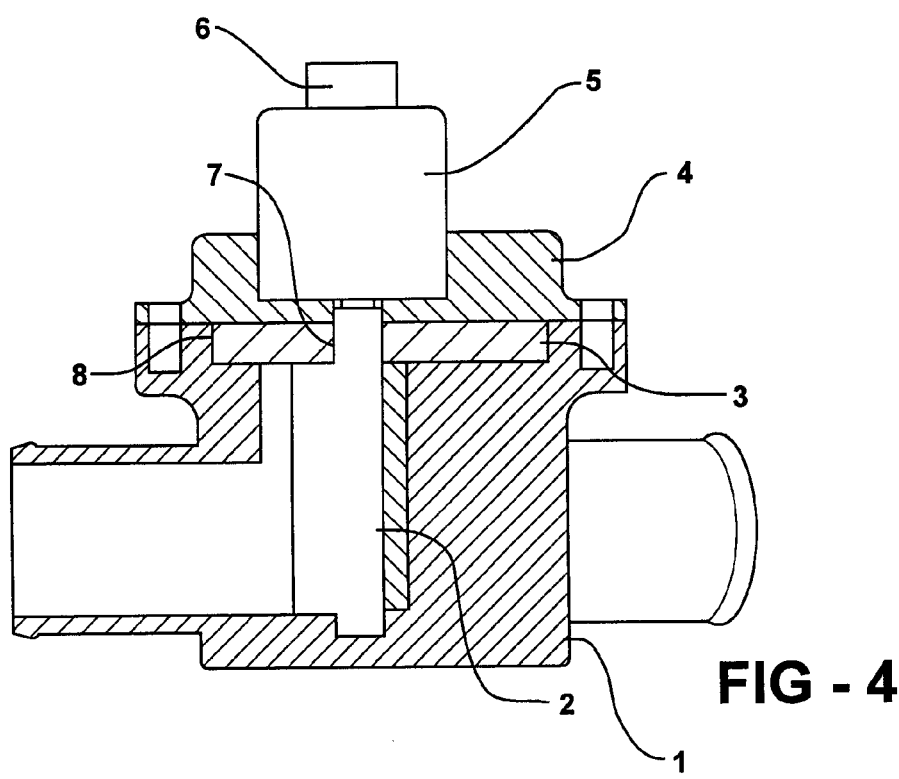
FIG. 4 is a cross-sectional view taken along line 4—4 of FIG. 3.

The actuator 5 can be any actuator that can overcome the load torque of valve core 2 and output valve rotary position, including, but not restricted to, DC motors, stepper motors, servomotors, gear motors, controllable rotary solenoid actuators, and linear actuators with moment arms. A cost effective actuator may be a DC motor with a worm gear set, as shown in FIG. 2. The driving mechanism or actuator 5 shown in FIG. 2 includes a DC motor 5A, worm gear 5B, worm 5C and two bushings which are not labeled. A "Hall effect" rotary position sensor 6 is mounted on the shaft of valve core 2 through a connector (not labeled). This type of actuator can maintain a required valve position without continuous power consumption because of the operating characteristics of a worm gear set. The sensor 6 measures valve position and provides feed back of the measured signals to a central controller or CPU, which provides the control strategy for controlling the rotary movement of the DC motor. Such a control system is well known and is outside the scope of the present invention.

Figure 5:
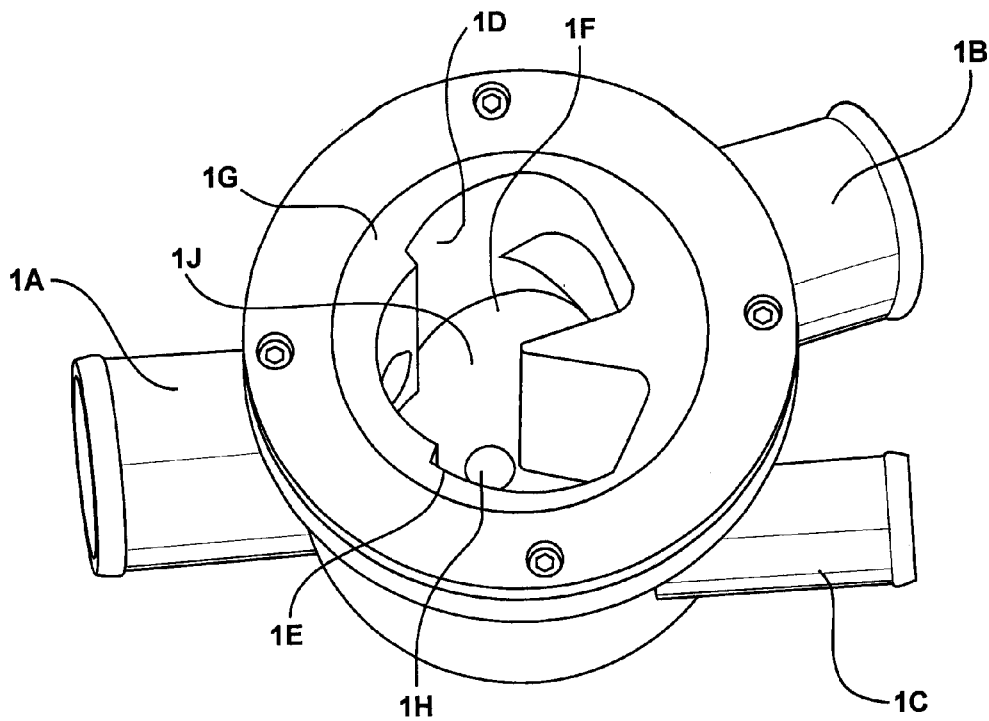
FIG. 5 is a detailed perspective view of the valve housing with a specially contoured inside wall.
Figure 6:
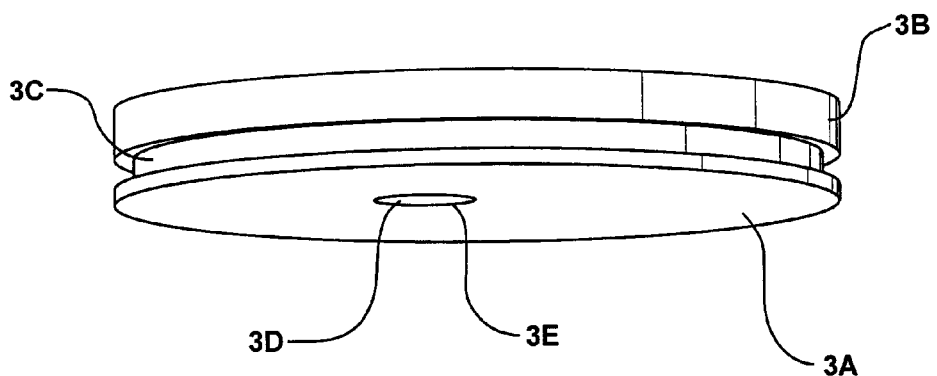
FIG. 6 is a detailed perspective view of the sealing plate.
Figure 7:
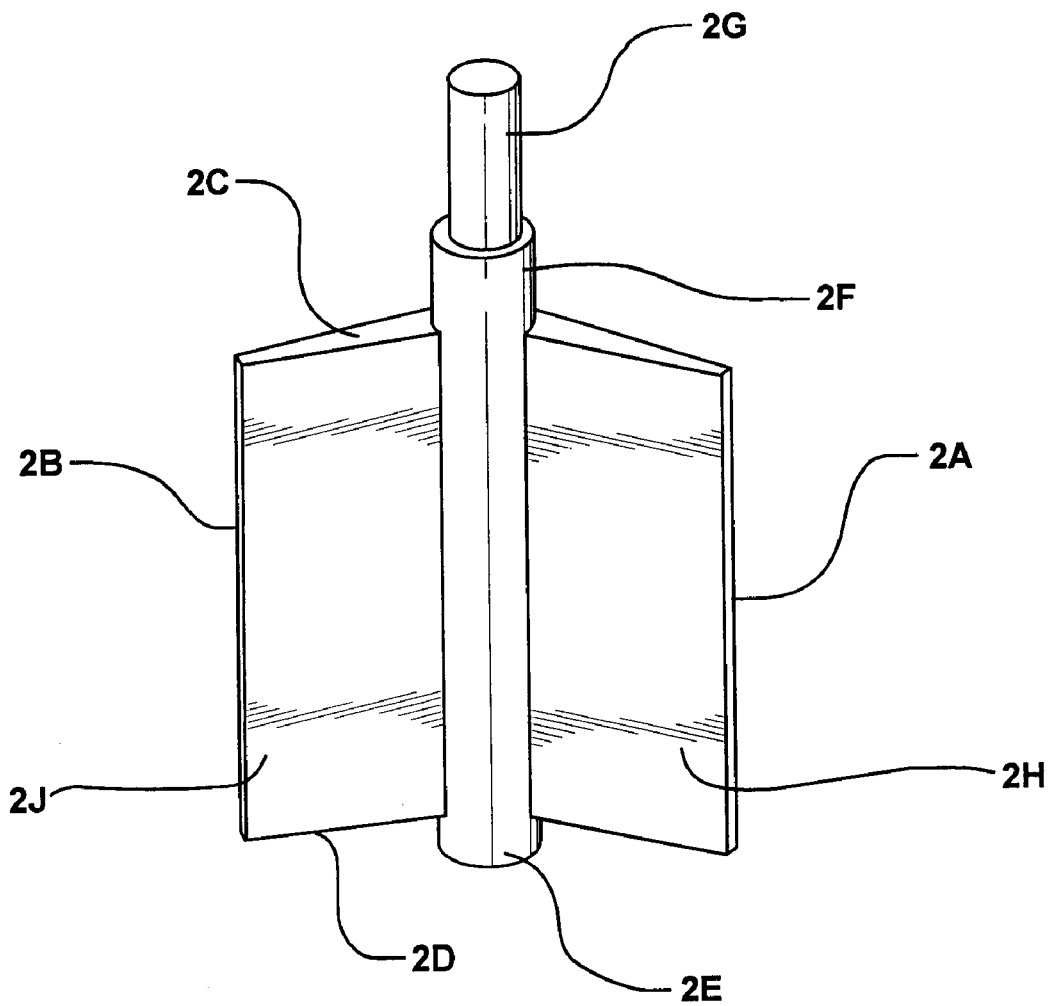
FIG. 7 is a detailed perspective view of the valve core.
Figure 8:
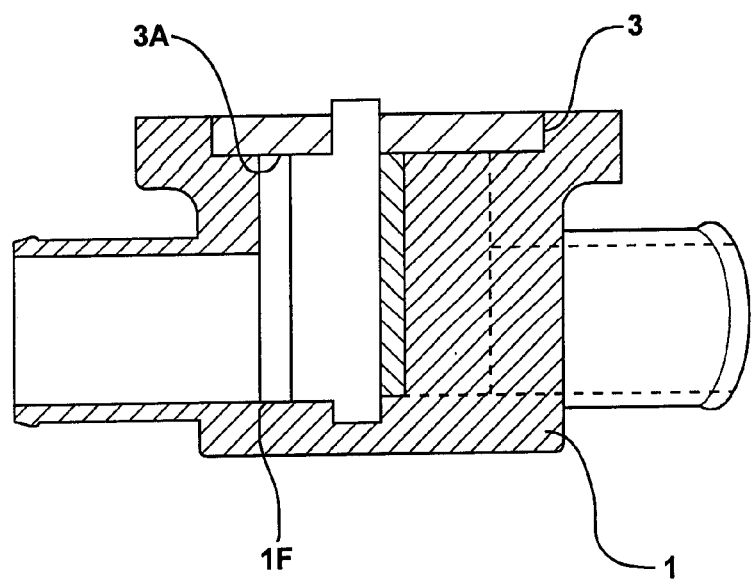
FIG. 8 is a cross-sectional side view of the valve body and butterfly valve core whereby coolant flows to both the main passage and the bypass passage.
Figure 9:
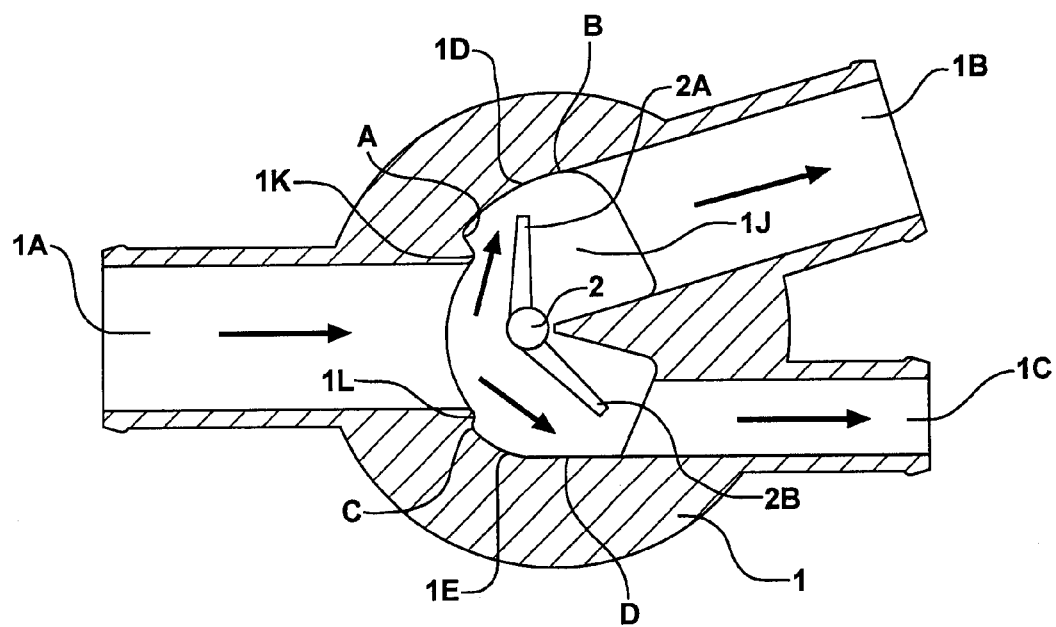
FIG. 9 is a cross-sectional top view of the valve body and butterfly valve core whereby coolant flows to both the main passage and the bypass passage.

As illustrated in FIG. 5, valve housing 1 has an inlet port 1A, a main outlet port 1B, a bypass outlet port 1C and a cavity hole 1J and a specially designed inside wall. A round counter-bore hole 1G is used to seat the sealing plate 3, which is detailed in FIG. 6. A hole 1H is counter-bored down into the bottom surface 1F for bushing the bottom part of shaft 2G of valve core 2, which is detailed in FIG. 7. The inside wall of valve housing 1 has two working portions which are labeled 1D and 1E. The sealing plate 3, as shown in FIG. 6, has two grooves 3C, 3E on surfaces 3B and 3D for seating seals 7 and 8 respectively. The hole surface 3D supports the valve rotation shaft 2G. Sealing plate 3 with seals 7 and 8 prevents coolant from entering the driving system. The valve core 2 has two throttling edges 2A and 2B, a top surface 2C and bottom surface 2D. The shaft 2G is supported on surfaces 2E and 2F by bearings or bushings and transmits rotary movement and torque from driving actuator 5 to valve core 2. The cross-sectional view shown in FIGS. 8 and 9 illustrate the assembly of the main components of the present invention.

As described earlier, the valve housing 1 has two working portions labeled 1D and 1E which are essential features of the present invention. The two inside wall surfaces 1D and 1E, and the bottom surface 1F of valve housing 1, together with the bottom surface 3A of sealing plate 3, and cylindrical end surfaces 2A and 2B of valve core 2 collectively form two rectangular throttling openings through which coolant can flow, as indicated by arrows shown in FIG. 9.

Figure 10:
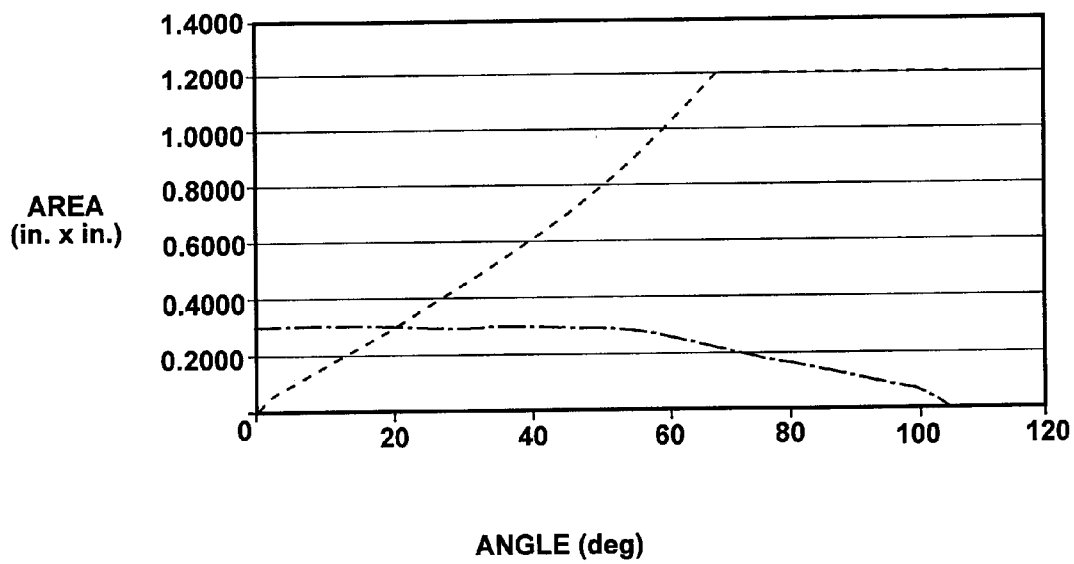
FIG. 10 is a schematic graph illustrating the relationship between the throttling areas of the main port and bypass port as a function of the valve rotary angle.

At any valve position, the respective areas of two openings determine the flow distribution between the main passage outlet port 1B and bypass outlet port 1C. The opening area for main passage flow at a given valve angular position is defined by the height of butterfly valve core 2 and the shortest distance between end surface 2A of valve core 2 and inside wall surface 1D of valve housing 1. Similarly, the opening area for bypass flow depends on the height of butterfly valve core 2 and the shortest distance between end surface 2B of valve core 2 and inside wall surface 1E of valve housing 1. The working portions 1D and 1E of inside wall of valve housing 1 are designed such that the area of two openings varies from 0 to a saturated value, corresponding to a fully opened valve. The relationships between the throttling areas of the main port and bypass, relative to the valve rotary angle, are shown in FIG. 10.

Figure 11:
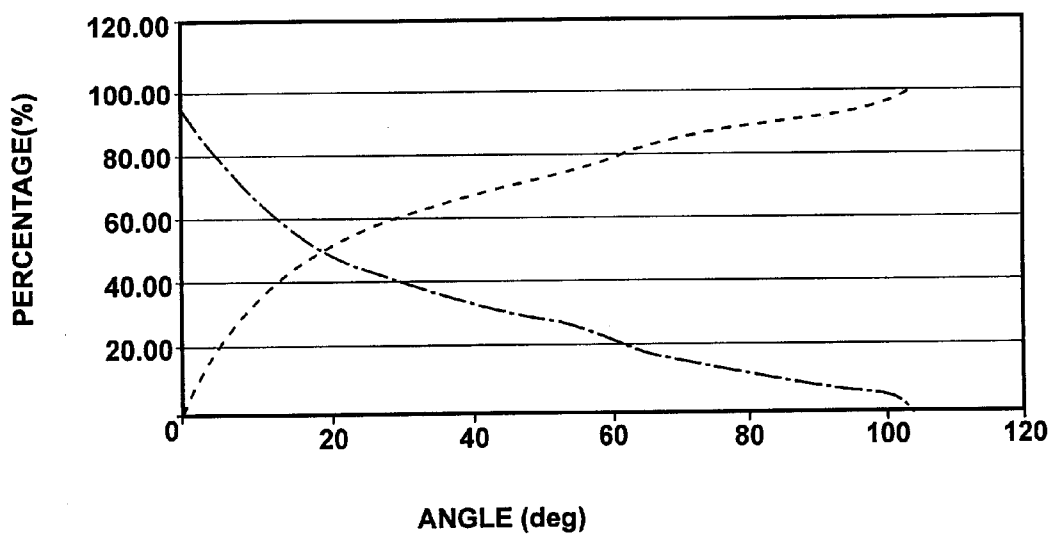
FIG. 11 is a schematic graph illustrating the flow distribution between the main outlet port and the bypass port as a function of the valve rotary angle.

Sealing surfaces 1K and 1L allow the vanes 2H and 2J to seal against the housing when closing either port 1B or 1C. For the contour design shown in FIG. 9, the flow distribution between main port 1B and bypass port 1C, relative to the valve rotary angle, is shown in FIG. 11.

Figure 12:
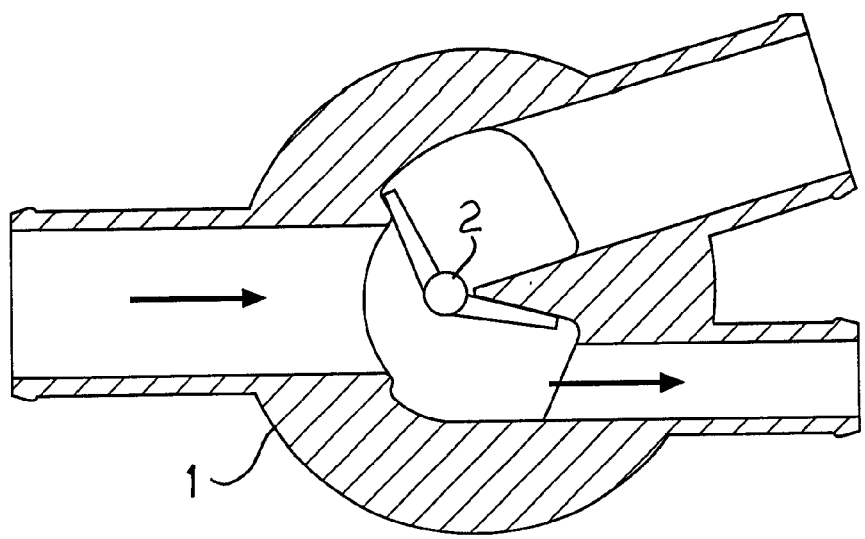
FIG. 12 is a cross-sectional top view of the valve body and butterfly valve core whereby coolant flows to only the bypass passage.
Figure 13:
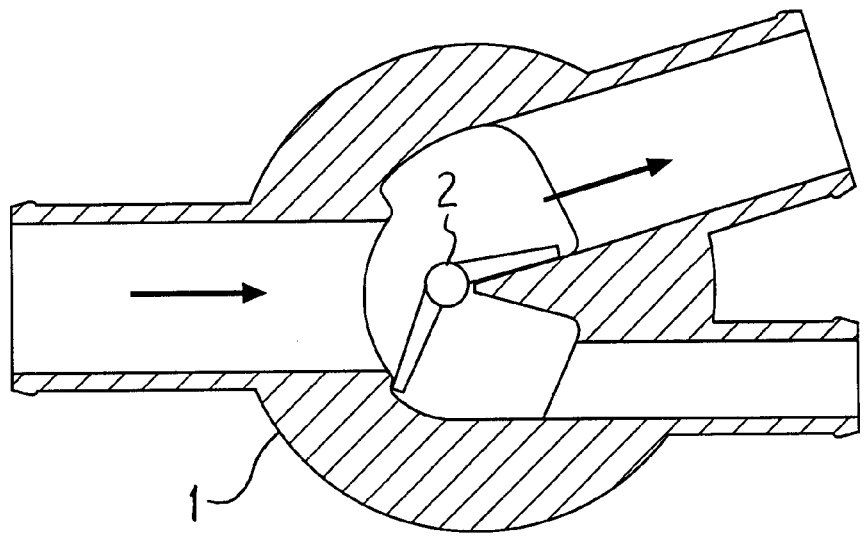
FIG. 13 is a cross-sectional top view of the valve body and butterfly valve core whereby coolant flows to only the main outlet passage.

FIG. 12 shows a butterfly valve position whereby the main port 1B is fully closed and the bypass port 1C is fully open, while FIG. 13 shows the opposite valve position, whereby the main port 1B is fully open and the bypass port 1C is fully closed.

Figure 14:
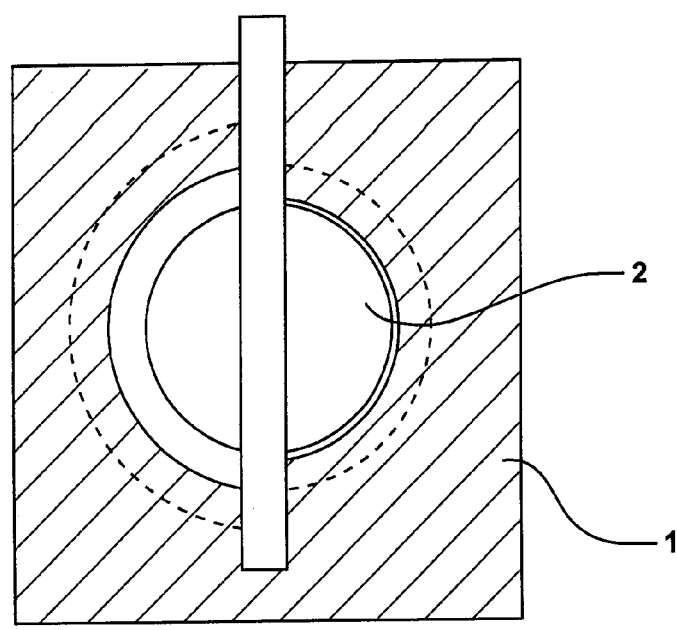
FIG. 14 is a cross-sectional view of an alternative embodiment whereby the throttling openings are C-shaped.
Figure 15:
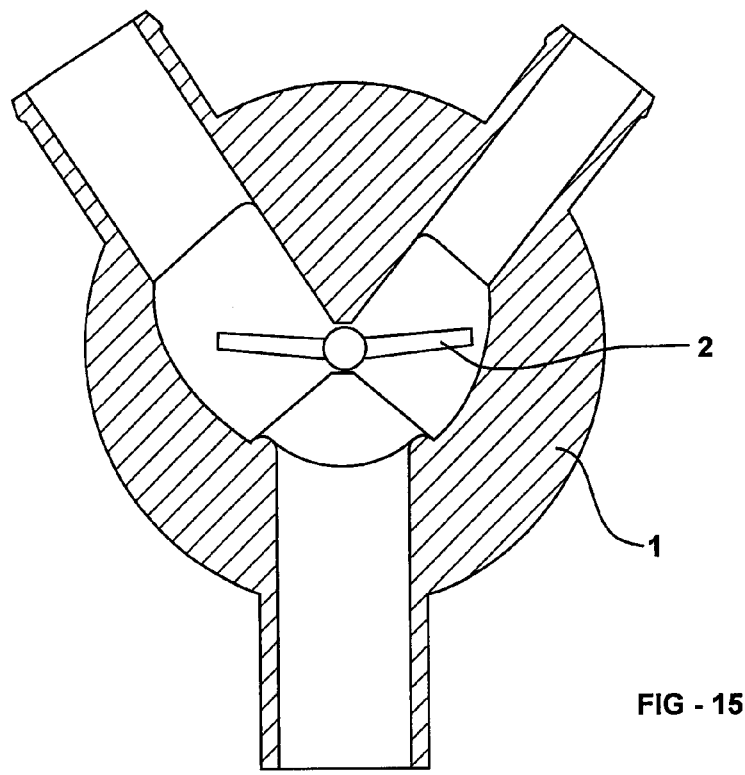
FIG. 15 is a cross-sectional view of an alternative embodiment whereby the butterfly valve core has two circular wings.

In another embodiment, the concept of a specially contoured inside valve housing wall is applied to the bottom surface IF of valve housing 1 and the bottom surface 3A of sealing plate 3 to form "C" shaped or "L" shaped throttling openings for the main port and bypass port. FIG. 14 illustrates a possible configuration with "C" shaped throttling openings and a butterfly valve core with two circular wings. Of course, different opening configurations can be achieved by designing different shapes for surfaces 1F, 3A, 1D and 1E. These specially designed surfaces form two wedging flow passages for the main output port and bypass, so that any debris present in the coolant can easily pass through them without clogging the valve.

In the case where only the inside wall of valve housing 1 has specially-designed surfaces 1D and 1E, wipers made of suitable soft material may be embedded in top surface 2C and bottom surface 2D of the valve core 2 to wipe away debris on surfaces 1F and 3A. Yet another solution involves designing the valve core 2 with wedge shaped top and bottom surfaces, assuming a slight leakage between those surfaces is allowable.

The degree of control over the coolant flow is much larger than in conventional systems, such that the electromagnetic thermostat is capable of more precise temperature regulation in the engine, leading to improved operating efficiencies and potentially reduced tailpipe emissions.

As stated before, sealing surfaces 1K and 1L allow valve vanes 2H and 2J to seal against the valve housing, closing either port 1B or 1C. However, if a driving mechanism is a worm gear set driven by a DC motor then when a control system attempts to drive the valve vanes 2H or 2J past their limit positions 1K or 1L at a sufficiently high speed, the abrupt stop of valve vane 2H or 2J by the sealing surface 1K or 1L may generate a sufficiently large impact load acting on the valve vane 2H or 2J, resulting in self locking of the worm gear set, which makes rotation of the valve 2 in the opposite direction difficult. In order to overcome the above-mentioned problems which may be caused by the control system or driving mechanism 5, a damping mechanism maybe introduced into this invention.

Figure 16:
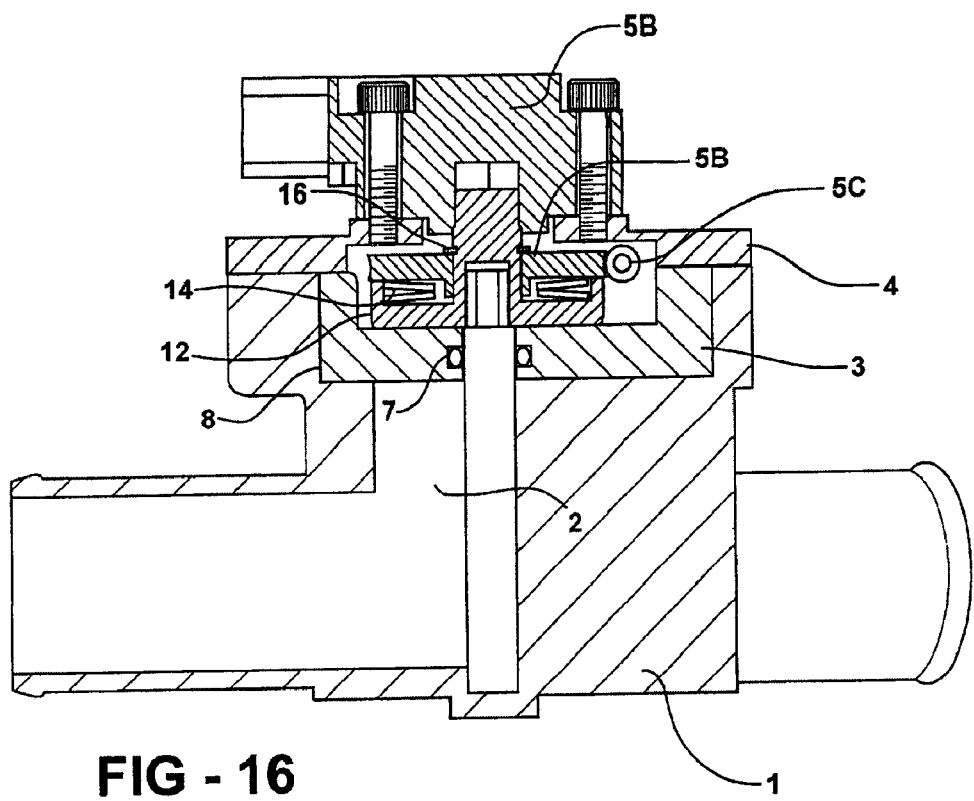
FIG. 16 is a cross-sectional view of the proportional valve having an alternative worm gear subassembly driving mechanism.
Figure 17:
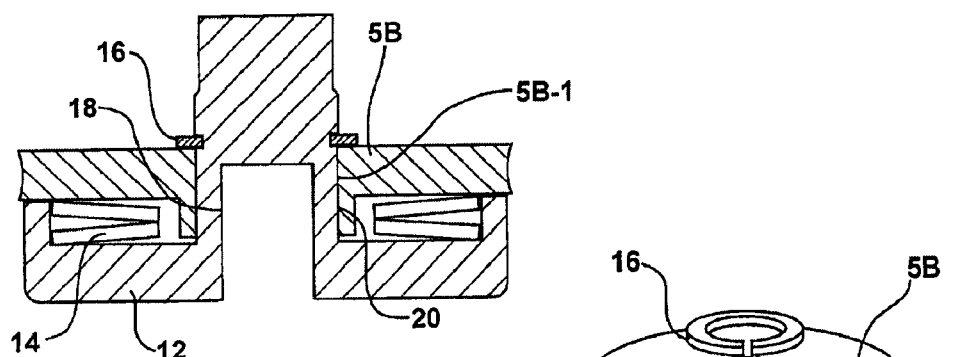
FIG. 17 is a cross-sectional view of the worm gear subassembly of FIG. 16.
Figure 18:
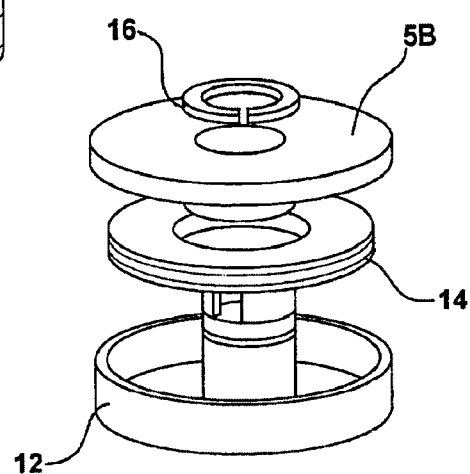
FIG. 18 is an exploded view of the worm gear subassembly of FIG. 17.

FIG. 16 shows the cross section of the assembly of another embodiment of the proportional valve with a worm gear subassembly. FIG. 17 shows the cross-section of the worm gear sub-assembly with a clutch damping mechanism while FIG. 18 shows an exploded view of the worm gear sub-assembly. The worm gear subassembly is used to replace worm gear 5B shown in FIG. 2. As shown in FIG. 17, the worm gear subassembly with a clutch damping mechanism includes a clutch base 12, a wave spring washer or a disc spring washer 14, a retaining ring 16, and a worm gear 5B. The clutch base 12 is keyed to valve core 2 through the bore hole 18 with key ways and has a shaft surface 20 which provides an assembly base for the worm gear 5B. There is a clearance between the worm gear bore hole 5B-1 and the shaft surface 20 of clutch base 12. This allows a rotational degree of freedom between worm gear 5B and clutch base 12. One or more compressed wave spring washers or disc spring washers 14 are placed between worm gear 5B and clutch base 12. The recess on clutch base 12 provides space for spring 14. Retaining ring 16 holds the worm gear 5B in place and bears the reacting force that the compressed spring 14 exerts on worm gear 5B.

Referring to FIG. 16, when the worm 5C driven by a rotary actuator (DC motor) drives worm gear 5B, the compressed spring 14 generates a drag torque acting on clutch base 12, which drives valve core 2. The selection of spring 14 and its pre-load ensures that the drag torque is sufficiently large to overcome the maximum load torque acting on the valve core shaft. However, the worm drive 5B and 5C must be able to overcome this drag torque and rotate relative to clutch base 12 when a sudden stop of valve vanes 2H or 2J by sealing surfaces 1K or 1L occurs. Such a selection and setting of spring 14 effectively prevents worm gear set 5B and 5C from being jammed or self locked.

In order to eliminate possible jamming of worm gear set, a spring loaded clutch is used as a damping mechanism for this embodiment of present invention. Such a damping mechanism may not be necessary if a suitable control strategy is used in the control system of the proportional valve to prevent impact from taking place. Obviously, other damping means can be used. For example, elastic materials may be attached on sealing surfaces 1K and 1L to reduce possible impact. Using elastic materials and corresponding structure design to replace the spring loaded clutch may be another possible option. Furthermore, hydraulic damping principle may be considered as a choice.

Figure 19:
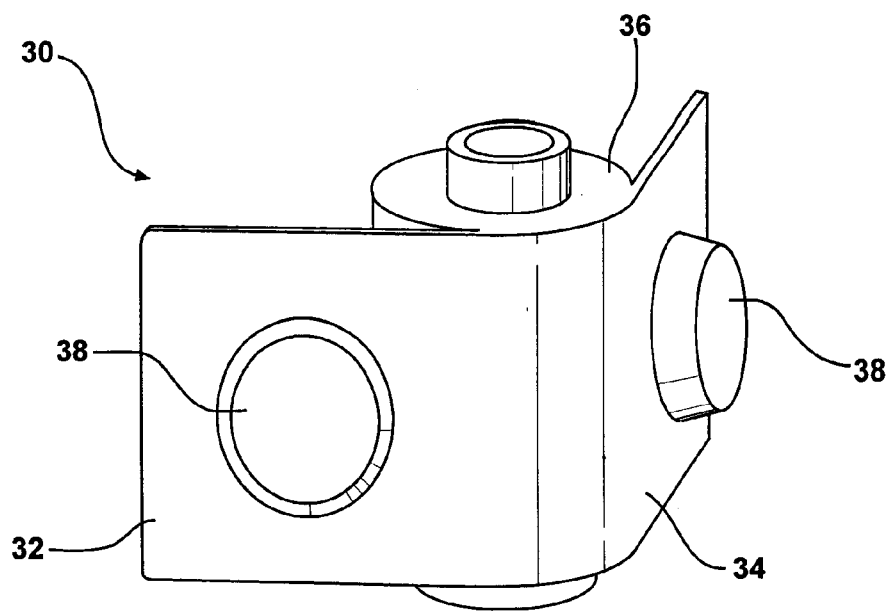
FIG. 19 is a perspective view of an alternative embodiment of the butterfly valve with cone-shaped vane flow restrictors.
Figure 20:
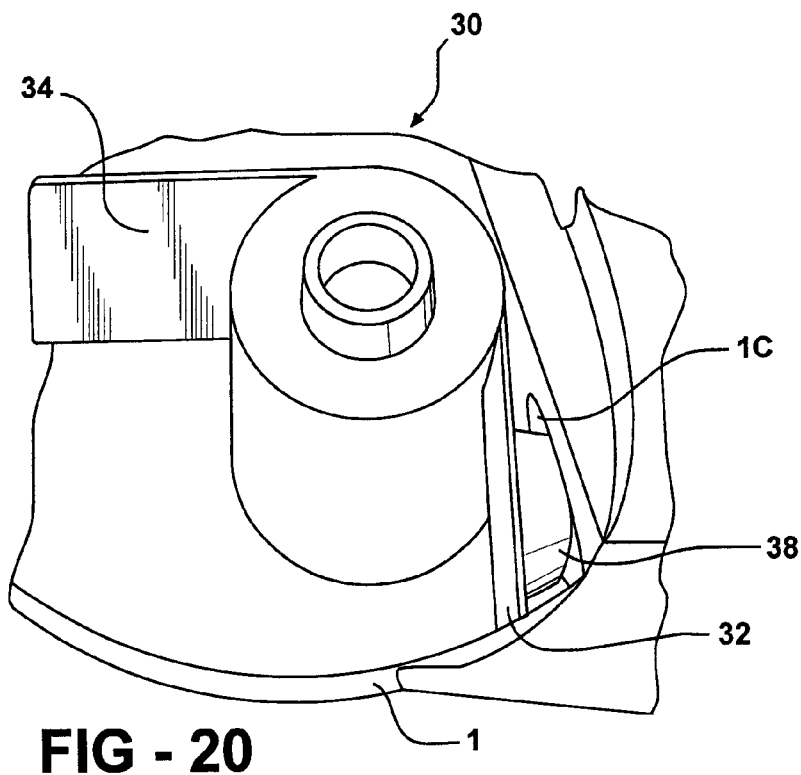
FIG. 20 is a top perspective view of the alternative butterfly valve and cone-shaped vane flow restrictor seated adjacent the bypass port.
Figure 21:
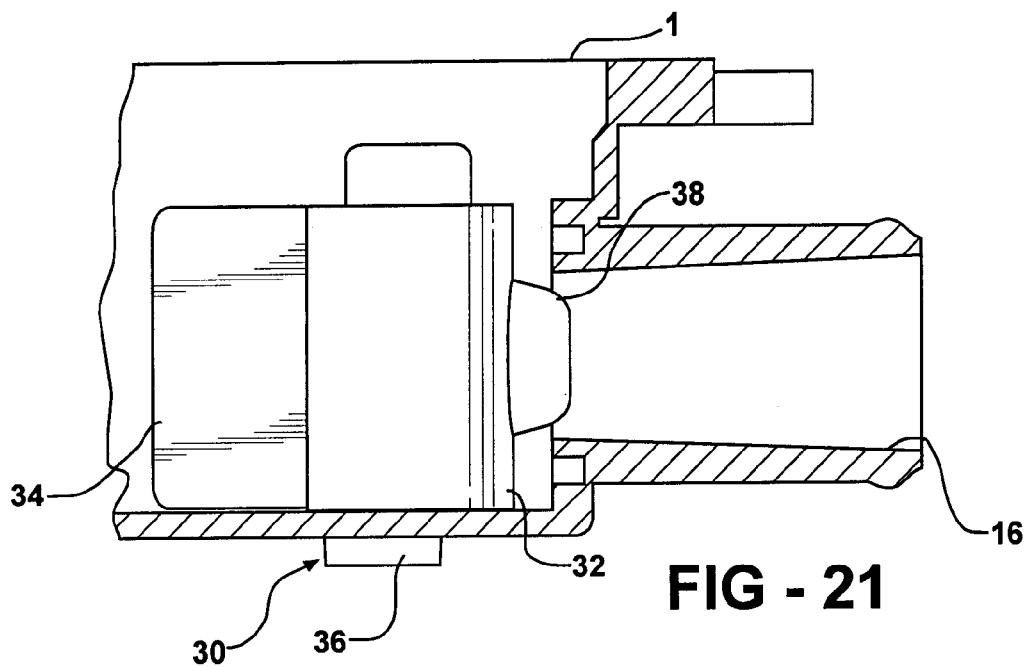
FIG. 21 is a cross-sectional view of the alternative butterfly valve and cone-shaped van flow restrictor seated in the bypass port.
Figure 23:
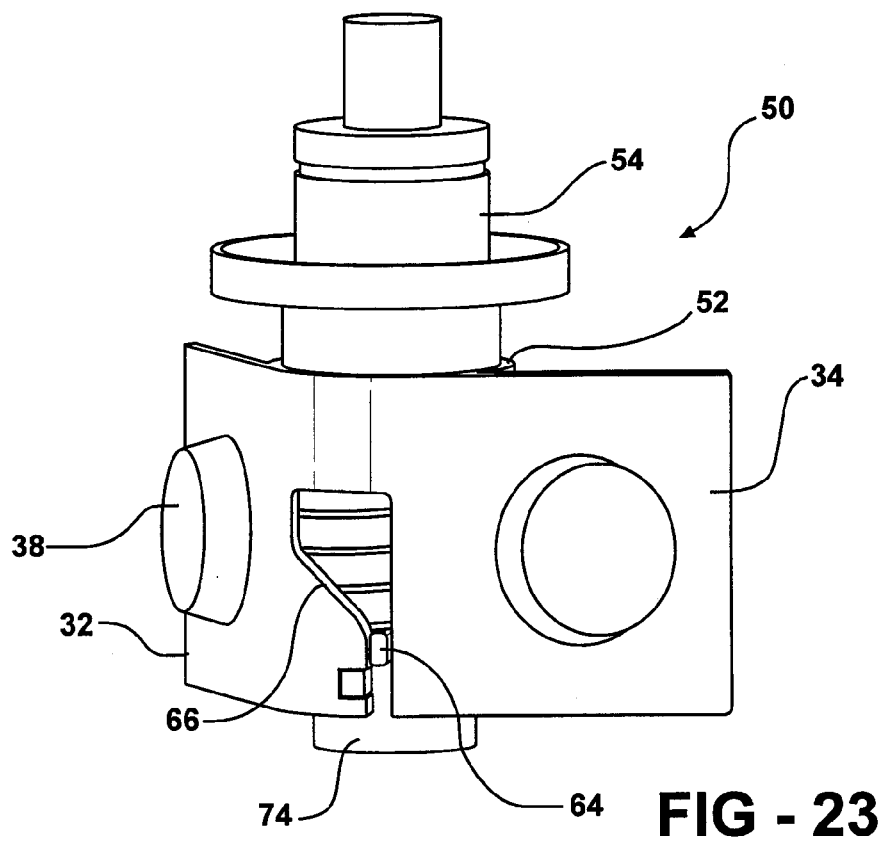
FIG. 23 is a side view of the valve assembly of FIG. 22 in normal operating and locked position.
Figure 22:
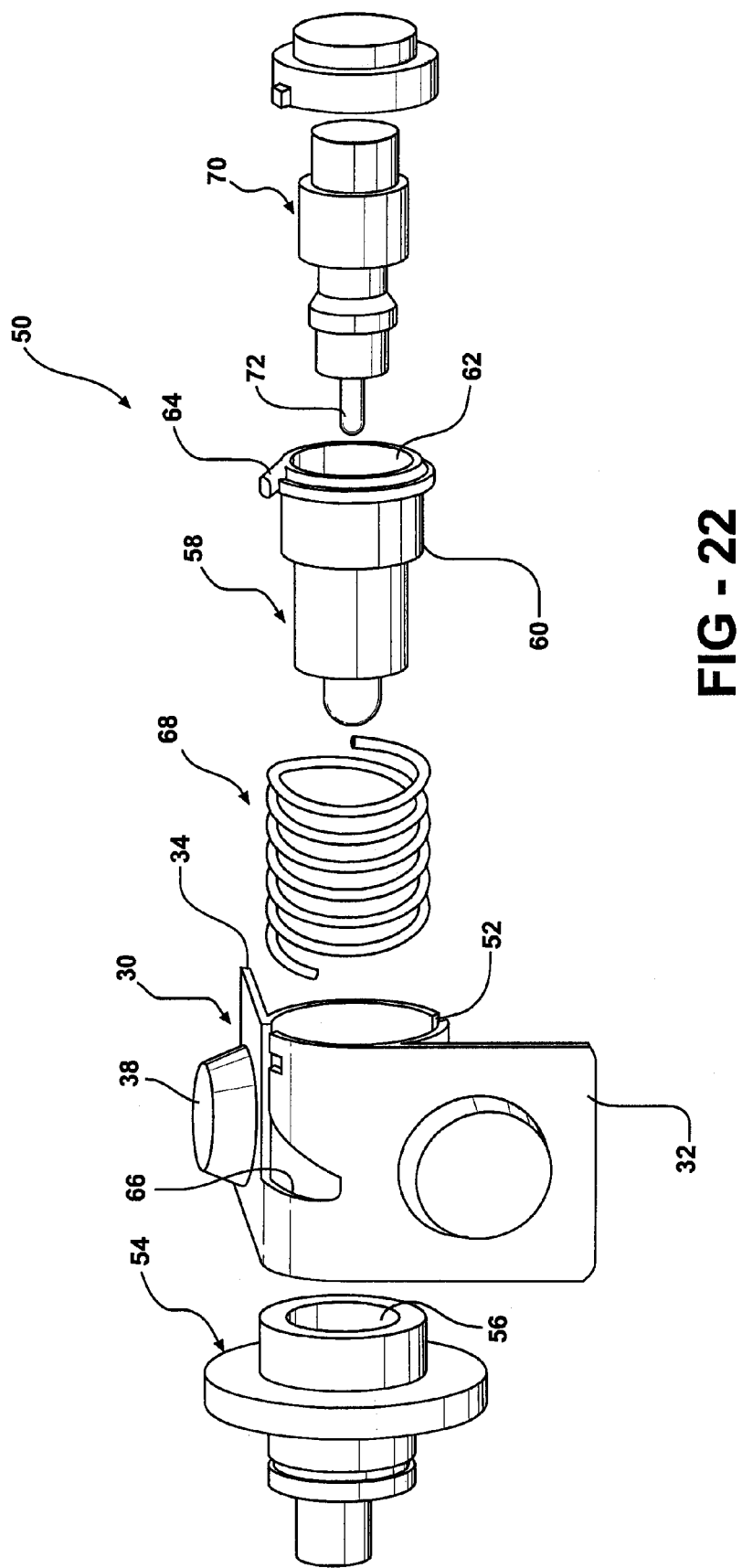
FIG. 22 is an exploded perspective view of yet another alternative embodiment of a thermostat valve assembly having a failsafe mechanism.
Figure 24:
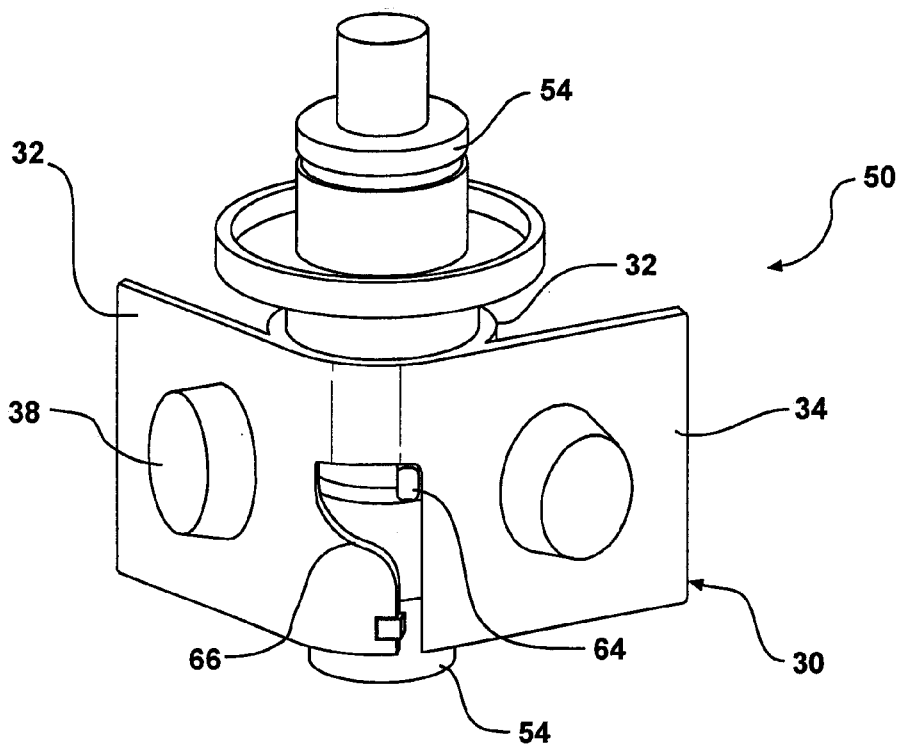
FIG. 24 is a perspective view of the valve assembly of FIG. 22 with the failsafe mechanism in the unlocked position.
Figure 25:
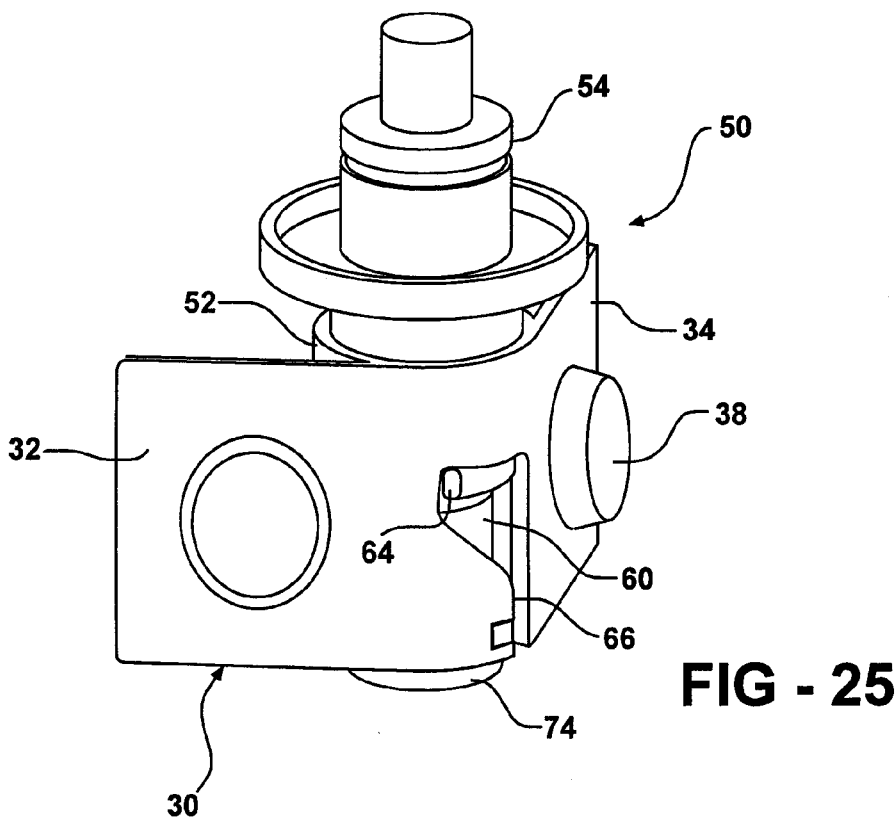
FIG. 25 is a perspective view of the valve assembly of FIG. 22 with the butterfly valve rotated to the failsafe open position.

Referring to FIGS. 19–21, an alternative embodiment of a butterfly valve is shown at 30. The valve 30 includes a pair of spaced apart vanes 32, 34 extending outwardly from a valve rotation shaft 36 which is rotatably seated in the valve housing 1 as previously described. Each of the vanes 32, 34 is a generally rectangular planar plate and each includes a cone-shaped flow restrictor 38 protruding from the center thereof. The flow restrictors 38 are position to align with and be seating in the opening formed in the main outlet port 1B and bypass outlet port 1C to improve the flow characteristics of the fluid through the valve assembly 10 between the open and closed positions. More specifically, a flat vane allows for a rapid increase in coolant flow within the first few degrees of valve rotation creating a nonlinear relationship between fluid flow and vane angle diminishing the valve's ability to regulate or modulate small amounts of coolant flow as the vane or valve begins to open. The addition of the cone shaped flow restrictor protrusions 38 on the back side of the vanes 32, 34 gradually restricts the coolant flow at the extreme vane position, or in the first few degrees of vane rotation between open and closed, and therefore creates a more linear flow characteristic and better flow control in the extreme initial range of 10 degrees of vane or valve rotation. As shown in FIGS. 20 and 21, the restrictor 38 on the vane 34 gradually rotates and closes into the opening of the bypass port 1C to gradually and uniformly open or close the port 1C and linearly control the flow of coolant flow therethrough.

Figure 26:
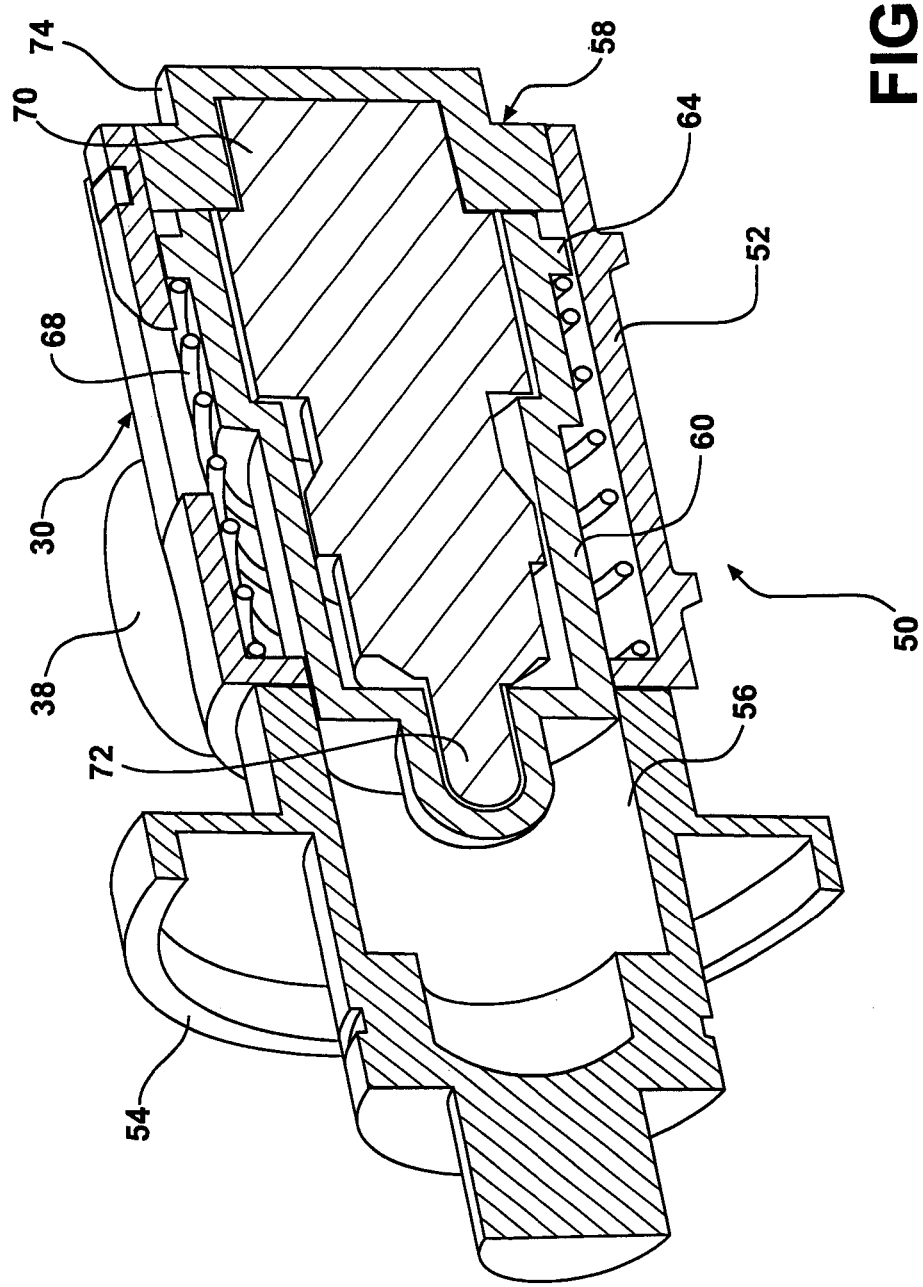
FIG. 26 is a cross-sectional view of the valve assembly and failsafe mechanism in the locked position.
Figure 27:
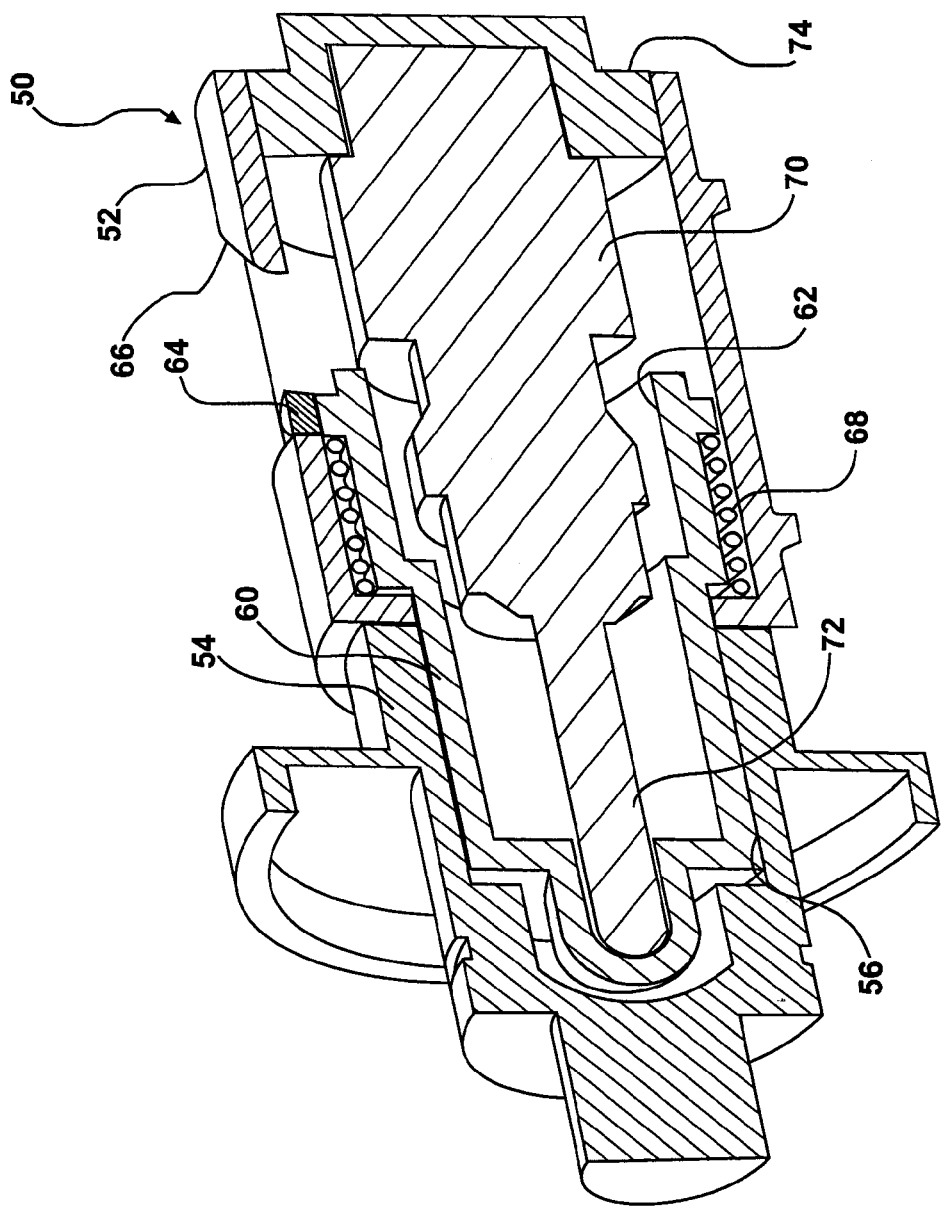
FIG. 27 is a cross-sectional view of the valve assembly and failsafe mechanism in the unlocked position.

Finally, referring to FIGS. 22–27, yet another alternative embodiment of the valve assembly is shown at 50. The valve assembly 50 includes the butterfly valve core 30 of FIG. 19 includes the pair of vanes 32, 34 with cone-shaped flow restrictors 38. The vanes 30 project outwardly from a hollow, cylindrical valve rotation shaft 52. A clutch housing 54 is seated on the top portion of the valve shaft 52 for cooperative engagement with the worm gear drive assembly 5. The clutch housing 54 has a hollow, cylindrical center 56 in mating engagement with the hollow shaft 52. The valve assembly 50 further includes a failsafe mechanism 58 to prevent the drive assembly 5 from self-locking when the vanes are in the locked or closed position against the valve openings. More specifically, the failsafe mechanism 58 includes a cone-shaped locking key 60 slidably received in the hollow shaft 52 and capable of slidably projecting into the hollow center 56 of the clutch housing 54. Further, the locking key 60 is rotationally keyed to the clutch housing 54 to prevent relative rotation therebetween, but freely rotatable within the hollow shaft 52 of the butterfly valve 30. The locking key 60 includes a cylindrical hollow center bore 62 and a pair of locking tabs 64 projecting outwardly from the lower portion of the outer cylindrical wall for cooperation with the valve shaft 52. Specifically, the valve shaft 52 includes tapered cut-out windows 66 for receiving the locking tabs 64 wherein the windows 66 retain the locking tabs 64 and prevent rotation of the locking key 60 within the valve 30 in the locked position seated in the bottom of the shaft 52 and spaced from the clutch housing 54, as shown in FIG. 26, and allow rotation of the valve 30 around the locking key 60 in the unlocked position, as shown in FIG. 27. A coil spring 68 is seated around the locking key 60 within the hollow valve shaft 52 and compressed to bias the locking key 60 to the locked position.

The failsafe mechanism 58 further includes an actuator element 70, which in the preferred embodiment is a wax element, seated in the hollow center bore 62 of the locking key 60 for actuating the locking key 60 between the locked and unlocked positions. The actuator 70 includes a heat activated stem 72 which stocks similar to a piston in response to a predetermined temperature. As shown in FIG. 27, when the actuator 70 is subjected to a predetermined temperature, the stem 72 extends longitudinally to engage with the locking key 60 and slide the key 60 longitudinally within the valve shaft 52 releasing the locking tabs 64 from the windows 66 and disengaging the locking key 60 from the valve 30 in the unlocked position to allow rotation of the valve 30. The actuator 70 is enclosed within the bore 62 by a cap 74 which covers and closes the end of the locking key 60 and valve shaft 52. The failsafe mechanism is calibrated to a temperature slightly above the normal extremes of the coolant temperature such that if the valve 30 locks in the closed position, the coolant temperature will quickly increase, causing the stem 72 to stroke and disengage the valve 30 from the locking key 60. The coolant pressure through the inlet port 1A will then rotate the valve 30 partially open and prevent the engine from overheating.

Having now fully described the invention, any changes can be made by one of ordinary skill in the art without departing from the scope of the invention as set forth herein.

What is claimed is:

1. An electromagnetically controlled thermostat valve assembly for an automotive vehicle comprising:
   a valve housing having an inlet port in fluid communication with an outlet port;
   a valve core seated in said housing for selectively opening and closing said outlet port;
   a driving mechanism operatively coupled to said valve core for positioning said valve core between open and closed positions relative to said outlet port; and
   a damping mechanism coupled between said driving mechanism and said valve core for preventing the driving mechanism from locking in one of said open and closed position during loading of said valve core with said housing and said inlet and outlet ports.

2. A valve assembly as set forth in claim 1 wherein said valve housing includes a center bore defined by at least one contoured inside wall defining a fluid passageway between said inlet port and said outlet port when said valve core is in said open position.

3. A valve assembly as set forth in claim 2 wherein said valve core includes a valve rotation shaft for rotatably mounting said valve core to said valve housing in said center bore and at least one vane projecting outwardly from said shaft for closing said fluid passageway between said inlet port and outlet port.

4. A valve assembly as set forth in claim 3 wherein said inside wall of said valve housing includes a sealing surface for engaging with said vane to close said fluid passageway in said closed position.

5. A valve assembly as set forth in claim 4 wherein said damping mechanism includes a spring seated between said valve core and said driving mechanism for absorbing said load of said driving mechanism in said open and closed position of said valve core.

6. A valve assembly as set forth in claim 5 wherein said valve housing includes a main outlet port and a bypass outlet portion in fluid communication with said inlet port.

7. A valve assembly as set forth in claim 6 wherein said valve housing includes a pair of contoured inside surfaces defining fluid passageways between said inlet port and said respective main outlet port and said bypass outlet port.

8. A valve assembly as set forth in claim 7 wherein said valve core includes first and second spaced apart vanes projecting outwardly from said shaft for selectively closing said main outlet port and said bypass outlet port.

9. A valve assembly as set forth in claim 8 wherein each of said inside surfaces includes a sealing surface protruding into said center bore for cooperative engagement with a respective one of said vanes for closing said fluid passageways between said inlet port and said respective main outlet port and bypass outlet port.

10. A valve assembly as set forth in claim 9 wherein each of said vanes includes a cone shaped flow restrictor projecting outwardly therefrom for seating in said opening of one of said main outlet port and bypass outlet port in said closed position for controlling the flow a fluid between said inlet port and said outlet ports.

11. An electromagnetically controlled thermostat valve assembly for an automotive vehicle comprising:
    a valve housing having an inlet port in fluid communication with an outlet port;
    a valve core seated in said housing for selectively opening and closing said outlet port;
    a driving mechanism operatively coupled to said valve core for positioning said valve core between open and closed positions relative to said outlet port; and
    a failsafe mechanism coupled between said driving mechanism and said valve core for disengaging said driving mechanism from said valve core and allowing relative rotation therebetween thereby preventing the driving mechanism from locking in one of said open and closed position during loading of said valve core with said housing and said inlet and outlet ports.

12. A valve assembly as set forth in claim 11 wherein valve core includes a hollow shaft and said failsafe mechanism includes a locking key slidably mounted within said hollow shaft for movement between a locked position prevented from rotating relative to said valve core and an unlocked position engaged with said driving mechanism and free for rotation relative to said valve core.

13. A valve assembly as set forth in claim 12 wherein said failsafe mechanism includes an actuator element operatively coupled between said valve core and said locking key for actuating said locking key between said locked and unlocked position.

14. A valve assembly as set forth in claim 13 further including a spring element seated between said valve core and said locking key for biasing said locking key to said locked position.

15. A valve assembly as set forth in claim 14 wherein said locking key includes a hollow center bore for receiving and seating said actuator element and a outer portion rotatably keyed to said driving mechanism.

16. A valve assembly as set forth in claim 15 wherein said actuator element includes a stem extendable longitudinally for engagement with said locking key in response to a predetermined temperature of said fluid in said valve housing for longitudinally sliding said locking key from said locked position to said unlocked position and allowing rotation of said valve core relative to said driving mechanism and said locking key.

17. A valve assembly as set forth in claim 16 wherein said valve core includes at least one vane projecting outwardly from said shaft for closing said fluid passageway between said inlet port and outlet port.

18. A valve assembly as set forth in claim 17 wherein said valve core includes a tapered cut-out window for receiving and guiding a locking tab projecting from said locking key and selectively interlocking said locking key and said valve core in said locked position to prevent relative rotation therebetween.

\* \* \* \* \*